United States Patent
Liu et al.

(10) Patent No.: US 11,620,535 B2
(45) Date of Patent: Apr. 4, 2023

(54) HEURISTIC IDEATION

(71) Applicant: International Business Machines Corporation, Armonk, NY (US)

(72) Inventors: Xi Xi Liu, Shanghai (CN); Shuai Cao, Shanghai (CN); Jing Ran Yang, Shanghai (CN); Yidan Lei, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 779 days.

(21) Appl. No.: 16/581,834

(22) Filed: Sep. 25, 2019

(65) Prior Publication Data

US 2021/0089930 A1 Mar. 25, 2021

(51) Int. Cl.
G06N 5/00 (2023.01)
G06N 5/01 (2023.01)
G06N 20/00 (2019.01)
G06F 40/30 (2020.01)

(52) U.S. Cl.
CPC .............. *G06N 5/01* (2023.01); *G06F 40/30* (2020.01); *G06N 20/00* (2019.01)

(58) Field of Classification Search
CPC ......... G06N 5/003; G06N 20/00; G06F 40/30
USPC .......................................................... 706/55
See application file for complete search history.

(56) References Cited

U.S. PATENT DOCUMENTS

| 5,182,793 | A | 1/1993 | Alexander |
| 8,954,431 | B2 | 2/2015 | Okazaki |
| 9,367,608 | B1* | 6/2016 | Zhang ................ G06F 16/3331 |
| 11,158,311 | B1* | 10/2021 | Zhang .................. G06F 40/284 |
| 2005/0033770 | A1 | 2/2005 | Oglesby |
| 2007/0031795 | A1 | 2/2007 | Victor |
| 2009/0292698 | A1* | 11/2009 | Remy ................... G06F 16/313 707/999.005 |
| 2011/0078105 | A1 | 3/2011 | Wallace |
| 2014/0255895 | A1 | 9/2014 | Shaffer |
| 2015/0039548 | A1 | 2/2015 | Mills |
| 2016/0357731 | A1* | 12/2016 | Zorzin ................. G06F 40/232 |
| 2017/0316326 | A1 | 11/2017 | Ricketts |
| 2018/0053119 | A1 | 2/2018 | Zeng |

(Continued)

FOREIGN PATENT DOCUMENTS

CN 107665362 A 2/2018

OTHER PUBLICATIONS

Shan et al., "Kaleidoscope: Computer-Assisted Ideation through Idea Network Exploration", Department of Computer Science, Stanford University, Printed Aug. 8, 2019, 8 pages.

(Continued)

*Primary Examiner* — Alan S Chou
(74) *Attorney, Agent, or Firm* — Brian M. Restauro

(57) ABSTRACT

Embodiments of the present invention provide methods, computer program products, and systems to for generating a chatbot that facilities discussion. Embodiments of the present invention, can be used to receive user input comprising user generated text and rate the received user input based on characteristics identified in the received user input. Embodiments of the present invention can further determine a thinking pattern based on the rated user input. Embodiments of the present invention can further generate a chat bot interface that facilitates ideation based on the determined thinking pattern.

20 Claims, 4 Drawing Sheets

(56) References Cited

U.S. PATENT DOCUMENTS

2018/0293483 A1 10/2018 Abramson
2019/0102375 A1* 4/2019 Goulikar ............... G06F 40/186

OTHER PUBLICATIONS

Yuan et al., "Semantic Ideation Learning for Agent-Based E-Brainstorming", IEEE Transactions On Knowledge and Data Engineering, vol. 20, No. 2, Feb. 2008, 1041-4347/08 © 2008 IEEE, 15 pages.
"The effective way to plan, brainstorm, discuss and decide", GroupMap | Collaborative Brainstorming & Group Decision-Making, Jun. 7, 2019, 9 pages, <https://www.groupmap.com>.

\* cited by examiner

HEURISTIC IDEATION

BACKGROUND

The present invention relates generally to the field of heuristics, and more particularly to heuristic ideation.

In computer science, a heuristic is generally defined as a technique designed for solving a problem more quickly when classic methods are too slow. In some cases heuristics can be used to find an approximate solution. This is typically achieved by considered multiple variables and prioritizing some characteristics over others. For example, characteristics such as optimality, completeness, accuracy, or precision might be deprioritized in favor for speed. Typically, the objective of a heuristic is to produce a solution in a reasonable time frame that is good enough for solving the problem at hand. This solution may not be the best of all the solutions to this problem but the solution derived from a heuristic has value in that arriving at solution did not require a prohibitively long time.

A heuristic ideation technique allows for generation of new ideas in a systematic and orderly way that allows systems to consider multiple possibilities in a short amount of time. The technique uses a grid that lists one or more characteristics that should be considered together with "rules of thumb" to quickly find the possibilities. The "rules of thumb" may include concepts such as new ideas are usually combinations of elements of existing ideas, that the core of many new ideas can often be captured by a two-element combination, and that those combinations of dissimilar items can trigger more ideas than combinations of similar items.

SUMMARY

Embodiments of the present invention provide methods, computer program products, and systems to for generating a chatbot that facilities discussion. In one embodiment of the present invention, a computer-implemented method is provided comprising: receiving user input comprising user generated text; rating the received user input based on characteristics identified in the received user input; determining a thinking pattern based on the rated user input; and generating a chat bot interface that facilitates ideation based on the determined thinking pattern.

BRIEF DESCRIPTION OF THE DRAWINGS

FIG. 2 is a flowchart depicting operational steps for generating a chat bot that facilitates discussion management, in accordance with an embodiment of the present invention;

DETAILED DESCRIPTION

Embodiments of the present invention recognize the need to develop assisted mechanisms in current ideation processes. For example, embodiments of the present invention recognize that current ideation processes are subject to "group-think" mentality which could lead to some ideas being overlooked. As such, embodiments of the present invention recognize that a balance of different thinking patterns allows for a more thorough discussion of ideas. Accordingly, embodiments of the present invention provide solutions for balancing thinking patterns to allow for more thorough discussions by generating and creating a chatbot that facilitates group discussion. For example, embodiments of the present invention can determine a thinking pattern for each member of a group, identify weaknesses in the group's cumulative thinking pattern, and interact with members of the group to assist with ideation. In some embodiments, the chatbot can generate a display that includes suggestions for individual members of the group.

Figure 1:
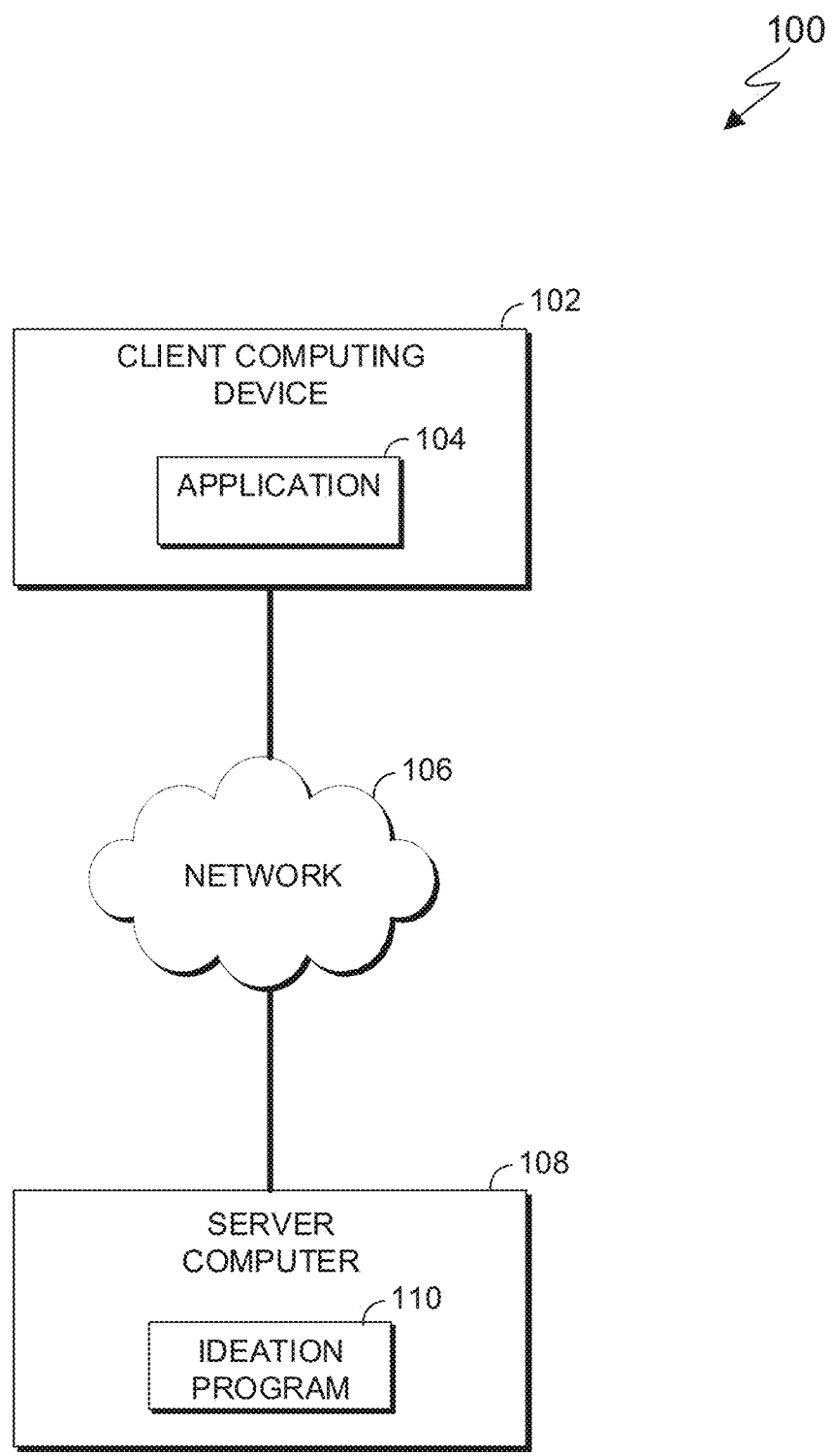
FIG. 1 is a functional block diagram illustrating an application permission environment, in accordance with an embodiment of the present invention.

FIG. 1 is a functional block diagram illustrating a computing environment, generally designated, computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108, all interconnected over network 106. client computing device 102 and server computer 108 can be a standalone computer device, a management server, a webserver, a mobile computing device, or any other electronic device or computing system capable of receiving, sending, and processing data. In other embodiments, client computing device 102 and server computer 108 can represent a server computing system utilizing multiple computer as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within computing environment 100. In some embodiments, client computing device 102 and server computer 108 are a single device client computing device 102 and server computer 108 may include internal and external hardware components capable of executing machine-readable program instructions, as depicted and described in further detail with respect to FIG. 4.

Client computing device 102 is a digital device associated with a user and includes application 104. Application 104 can be implemented using a browser and web portal or any program that can interface with or otherwise access ideation program 110. For example, a user can use application 104 to create a chatbot that facilitates group discussion. For example, embodiments of the present invention can utilize application 104 to interact with ideation program 110 to determine a thinking pattern for each member of a group, identify weaknesses in the group's cumulative thinking pattern, and interact with members of the group to assist with ideation as described in greater detail in FIG. 2.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computing device 102 and server computer 108, and other computing devices (not shown) within computing environment 100.

Server computer 108 is a digital device that hosts ideation program 110. In other embodiments, ideation program 110 can be stored locally on client computing device 102. In yet other embodiments, ideation program 110 can be stored on a combination of client computing device 102, server computer 108, or any other component of computing environment 100.

Ideation program 110 creates a chatbot that facilitates group discussion using heuristic ideation. For example, ideation program 110 can determine a thinking pattern for each member of a group, identify weaknesses in the group's cumulative thinking pattern, and interact with members of the group to assist with ideation. In this embodiment, ideation program 110 is trained with at least six characteristics. As used herein, a "characteristic" refers to a feature or factor that is being considered by ideation program 110. For example, a characteristic can be facts pertinent to the analysis, brightness and optimism (e.g., probing for value and benefit), judgment (e.g., difficulties or risks associated with an action), emotions (e.g., hunches, feelings, intuition, etc.), creativity (e.g., to explore possibilities, alternatives, and new ideas), and management. In other embodiments, other characteristics can be used to pre-train heuristic models used by ideation program 110.

In this embodiment, ideation program 110 can receive input from one or more components of computing environment 100. As used herein, an input can be one or more of audio, text, and video media. In instances where ideation program 110 receives audio input from a user, ideation program 110 can use any combination of natural language processing techniques to identify one or more sentences of the received input. Examples of natural language processing techniques include sentence splitting, tokenization, POS tagging, chunking, dependency parsing, anaphora resolution, etc.

Ideation program 110 can then rate each sentence based on characteristics identified in the received input. Continuing the above example, where audio is received comprising at least one sentence, ideation program 110 can then rate that sentence based on characteristics ideation program was trained on (e.g., facts pertinent to the analysis, brightness and optimism (e.g., probing for value and benefit), judgment (e.g., difficulties or risks associated with an action), emotions (e.g., hunches, feelings, intuition, etc.), creativity (e.g., to explore possibilities, alternatives, and new ideas), and management). Ideation program 110 can then assign a similarity score between a sentence and the previous sentence before as discussed in greater detail with regard to FIGS. 2 and 3. In other embodiments, ideation program 110 can rate each received input for each respective user in a given group.

In this embodiment, ideation program 110 rates each sentence based on characteristics identified in the received input and then generates a similarity score for a sentence as compared to a previous sentence. In this embodiment, ideation program 110 determines a thinking pattern using an artificial intelligence neural network to assign a similarity score for each subsequent received input (e.g., sentence B) to previously received input (e.g., sentence A). In this embodiment, the first sentence has a similarity score of [0, 0, 0, 0, 0] because it has no similarity to any previous sentence. For subsequent with the sentences, ideation program 110 determines a thinking pattern by combining the combined score for a sentence to the combined score of the subsequent sentence as discussed in greater detail with respect to FIGS. 2 and 3.

Figure 2:
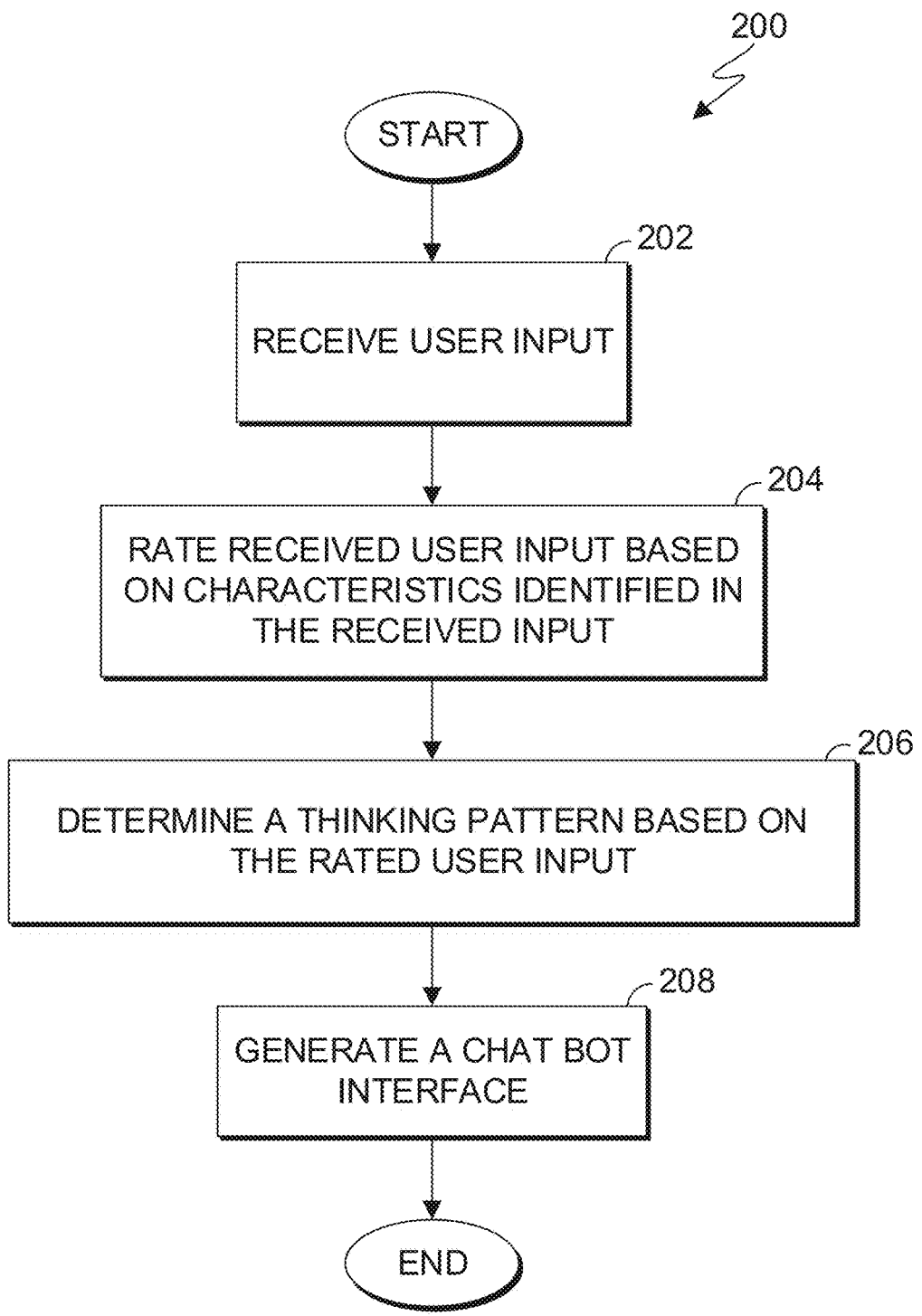
FIG. 2 is a flowchart depicting operational steps
Figure 3:
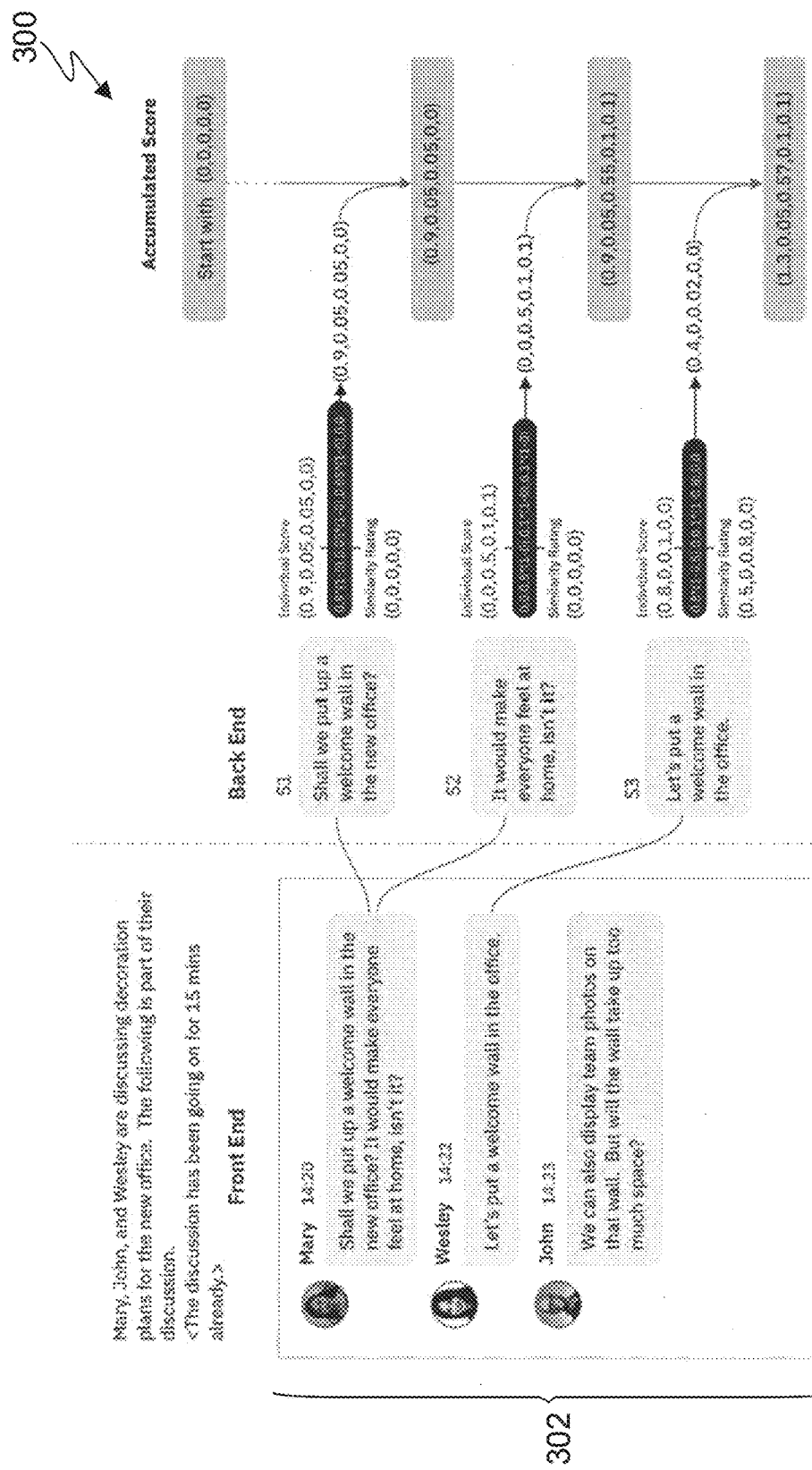
FIG. 3 is an example diagram that depicts rating calculations, in accordance with an embodiment of the present invention.

Ideation program 110 then combines the generated similarity score for the subsequent sentence (e.g., the generated similarity score for sentence B as being similar to sentence A) to the sentence score of the subsequent sentence (e.g., the sentence score for sentence B) and combines the combined score for sentence B to the sentence score for the previous sentence as described in greater detail with respect to FIGS. 2 and 3.

In certain other embodiments, ideation program 110 can generate a sentence rating (according to the characteristics) for each sentence identified in the received input and subsequently identify a thinking pattern each member of the group before generating similarity scores for each of the identified sentences. Ideation program 110 can then combine the generated sentence scores and similarity scores to determine a thinking pattern. As used herein, a thinking pattern is a tendency toward a particular pattern of intellectual behavior. For example, a thinking pattern associated with intellectuals have a tendency to identify and investigate problems, to probe assumptions, to seek reasons, and to be reflective. In other embodiments, ideation program 110 rates each received input based on characteristics regardless of the user and generates a rating that is used to determine a thinking pattern for the entire received input (e.g., to determine a thinking pattern for the entire group as opposed to determining a thinking pattern for each individual member of the group and then establishing or otherwise determining a thinking pattern for the entire group).

In this embodiment, ideation program 110 uses three logically distinct components that are necessary for dispositional thinking patterns: ability, inclination, and sensitivity. As used herein, "ability" concerns the basic capacity to carry out a behavior. In this embodiment, "inclination" concerns the motivation or impulse to engage in the behavior. Finally, "sensitivity" concerns likelihood of noticing occasions to engage in the behavior. Continuing the above example, ideation program 110 can then use the rated input and determined thinking pattern for each member of the group to determine a thinking pattern profile for the group as discussed in greater detail with regard to FIGS. 2 and 3. In this embodiment, ideation program 110 can rate the overall group for each of the thinking patterns on a numeric scale from 0 to 10, where lower numbers correspond to lesser values and higher numbers correspond to more desired values. Continuing the example, ideation program can rate the group as having a "5" for ability and "6" for inclination and an "8" for sensitivity.

In some embodiments, ideation program 110 can include a "rule and configuration model" (not shown) that refines this calculation by identifying different phases of received input. For example, where the received input is a text-based chat of a meeting, ideation program 110 can utilize the rule and configuration model to identify different phases of the meeting (e.g., beginning, middle, and end) and adjust weight values for each characteristic that ideation program 110 evaluates. For example, ideation program 110 can change the weight values assigned to "facts" in the beginning of the meeting to be weighted more than the weight value assigned to "facts" toward the end of a meeting.

Ideation program 110 can then identify one or more weaknesses in the determined thinking pattern based on the identified thinking pattern rating for the group. For example, where ideation program 110 rated the thinking pattern for the group as having a "5" for ability and "6" for inclination and an "8" for sensitivity, ideation program 110 can identify that the weakness of the group is "ability" because the category of "ability" has the lowest score.

Accordingly, ideation program 110 can then generate a chat bot messaging interface that interact with the user that addresses the identified weakness. For example, ideation program 110 can generate a chatbot, that, when interacted with can generate new questions that facilitate and manage discussion for the group. In some embodiments, ideation program 110 can transmit additional information to the group to assist with ideation.

In general, ideation program 110 can be figured to provide responses according to any user defined requirements. For example, ideation program 110 can generate a chat bot that responds within a specified time frame. For example, ideation program 110 can be configured to respond every minute or every five minutes. Ideation program 110 can also be configured to respond automatically or can be triggered by a user interaction.

FIG. 2 is a flowchart 200 depicting operational steps for generating a chat bot that facilitates discussion management, in accordance with an embodiment of the present invention.

In step 202, ideation program 110 receives user input. In this embodiment, ideation program 110 receives user input from client computing device via network 106. For example, a user can use application 104 to transmit input to ideation program 110. As previously described, an input can be one or more of audio, text, and video media. In other embodiments ideation program 110 can receive user input from one or more other components of computing environment 100.

In step 204, ideation program 110 rates the received user input based on characteristics identified in the received input. In this embodiment, ideation program 110 rates the received user input by assigning a rating for each identified characteristic in the received input. In this embodiment, where audio and/or text combination is the received user input, ideation program 110 analyzes the received input by using natural language processing techniques (e.g., any combination of sentence splitting, tokenization, POS tagging, chunking, dependency parsing, anaphora resolution, etc. to identify and classify user input) to parse the received input and identify sentences in the received input.

As mentioned above, a characteristic can be facts pertinent to the analysis, brightness and optimism (e.g., probing for value and benefit), judgment (e.g., difficulties or risks associated with an action), emotions (e.g., hunches, feelings, intuition, etc.), creativity (e.g., to explore possibilities, alternatives, and new ideas), and management. Using the characteristics listed above, ideation program 110 can then generate a rating for each identified characteristic in the received input (e.g., for each identified sentence).

In this embodiment, where either audio or text is received, ideation program 110 identifies each sentence as a distinct input and rates each sentence according to each characteristic. In this embodiment, ideation program 110 assigns a start value of "0" for each of the four respective characteristics (e.g., facts, optimism, judgment, creativity, and management). Ideation program 110 can then identify content of the input (e.g., the content of each sentence) using natural language processing techniques and assign a score for each characteristic).

In this embodiment, a numerical scale is used where lesser numbers indicate a lower value and higher numbers indicate a higher value. For example, sentence A's beginning rating starts as [0, 0, 0, 0, 0]. Ideation program 110 can then rate sentence A's content as [0.9, 0.05, 0.05, 0, 0] which corresponds to facts, optimism, judgment, creativity, and management, respectively. Ideation program 110 can then proceed to rating the next received sentence until each sentence in the received input is rated.

In step 206, ideation program 110 determines a thinking pattern based on the rated user input. In this embodiment, ideation program 110 determines a thinking pattern using an artificial intelligence neural network to assign a similarity score for each subsequent received input (e.g., sentence B) to previously received input (e.g., sentence A) based on shared characteristics of the sentences. Ideation program 110 can then generate a combined score of the sentence score and the similarity score (discussed in greater detail below). Ideation program 110 then determines a thinking pattern by combining the combined scores for each sentence as discussed in greater detail below.

In this embodiment, the first sentence has a similarity score of [0, 0, 0, 0, 0] because it has no similarity to any previous sentence. For subsequent sentences, ideation program 110 combines the similarity score of the subsequent sentence (e.g., the similarity score of the subsequent sentence to the previous sentence). Ideation program 110 can then determine a thinking pattern by combining the combined score for a sentence to the combined score of the subsequent sentence. Ideation program 110 uses the Formula 1 to combine the sentence rating and the similarity rating for sentence one, shown below.

$$a_{CSn} = a_1(S_1) \quad \text{Formula 1}$$

where $A_{CSn}$ represents the combined score for sentence 1; $a_1$ represents the sentence score for sentence one and $S_1$ represents the similarity score for sentence 1 to the previous sentence.

Ideation program 110 can use Formula 1 to generate a combined score for sentence 1. For example, where ideation program 110 determines the score for sentence 1 (represented as "a1") to be [0.9, 0.05, 0.05, 0, 0] and the similarity score (represented as "s1") as [0, 0, 0, 0, 0]. Ideation program 110 then combines those scores using Formula 1 to yield Example 1, shown below:

EXAMPLE 1

[0.9*(1−0), 0.05*(1−0), 0.05*(1−0), 0*(1−0), 0*(1−0)] to yield a combined score of [0.9, 0.05, 0.05, 0, 0] for sentence 1.

Ideation program 110 then combines the generated similarity score for the subsequent sentence (e.g., the generated similarity score for sentence B as being similar to sentence A) to the sentence score of the subsequent sentence (e.g., the sentence score for sentence B) by adding (i.e., summing) the numerical values for each respective characteristic to yield the combined score for sentence B (e.g., summing the values for the sentence score for sentence B with the similarity score for sentence B being similar to sentence A).

In this embodiment, ideation program 110 determines the thinking pattern for the received input by combining the combined score of the previous sentence to the combined score of the subsequent sentence using the formula below, designated Formula 2, to yield a combined total score for the received input. The combined total score for the received input is the value used by ideation program 110 to determine the thinking pattern.

$$a_{total} = a_1(S_1) + a_2(1-S_2) + a_3(1-S_3) + \ldots a_n(1-S_n) \quad \text{Formula 2}$$

where $a_{total}$ represents the combined score for all sentences in the received input; $a_1$ represents the sentence score for sentence 1 and $S_1$ represents the similarity score for sentence 1 to the previous sentence; $a_2$ represents the sentence score for sentence 1 and $S_2$ represents the similarity score for sentence 2 to the previous sentence (e.g., sentence 1); $a_3$ represents the sentence score for sentence 3 and $S_3$ represents the similarity score for sentence 3 to the previous sentence (e.g., sentence 2); $a_n$ represents the sentence score for a subsequent sentence; and $S_n$ represents the similarity score for the subsequent sentence to the previous sentence.

For example, where at least two sentences (e.g., sentence A and sentence B) are received, ideation program 110 generates a similarity score for the subsequent sentence (e.g., sentence B) to the previous sentence (e.g., sentence A). In other words, for each new sentence in a characteristic, ideation program 110 uses a neural network to do sequence input analysis and evaluate the correlativity with previous input. Continuing the example above and using Formula 2, ideation program 110 has identified two sentences, sentence a and sentence b. Sentence a, defined as "a1" can have rating values of [0.9,0.05,0.05,0,0]. Ideation program generates the similarity score for sentence one to a previous sentence (represented as "s1") as [0, 0, 0, 0, 0]. Continuing the example, ideation program 110 identifies sentence B is defined as "a2" has a rating of [0.8,0,0.1,0.1,0]. Ideation program 110 can then generate a similarity score to the previous sentence (e.g., sentence A defined as a1) as "s2" expressed as s2=[0.5, 0, 0.8, 0, 0]. Ideation program 110 then combines the scores using Formula 2 to identify the thinking pattern for sentences A and B (e.g., a1 and a2) is shown below by Example 2.

EXAMPLE 2

$a$=[0.9,0.05,0.05,0,0]+[0.8*(1−0.5),0,0.1*(1−0.8),0.1*(1−0),0]=[1.3,0.05,0.12,0.1,0].

Accordingly, ideation program 110 can determine the group thinking pattern by summing the combined sentence scores. Continuing the above example, ideation program 110 can identify that the received, cumulative input has a thinking pattern score of [1.3,0.05,0.12,0.1,0], which corresponds to a score of [1.3,0.05,0.12,0.1,0] facts, optimism, judgment, creativity, and management, respectively. Ideation program 110 can then use the generated score to identify that the thinking pattern for the received input is biased toward facts and has the lowest score (e.g., "0") for creativity.

In certain other embodiments, ideation program 110 can use three logically distinct components that are necessary to identify a thinking pattern based on the generated, combined score for the received input. For example, where three logically distinct components are used, ideation program can identify the group thinking pattern as having: ability, inclination, and sensitivity.

In some embodiments, ideation program 110 can include a "rule and configuration model" (not shown in FIG. 1) that refines this calculation by identifying different phases of received input. For example, where the received input is a text-based chat of a meeting, ideation program 110 can utilize the rule and configuration model to identify different phases of the meeting (e.g., beginning, middle, and end) and adjust weight values for each characteristic that ideation program 110 evaluates. For example, ideation program 110 can change the weight values assigned to "facts" in the beginning of the meeting to be weighted more than the weight value assigned to "facts" toward the end of a meeting.

In step 208, ideation program 110 can generate a chat bot interface that can facilitate discussion based on the determined thinking pattern. In this embodiment, ideation program 110 generates a chat bot interface by incorporating the determined thinking pattern with an artificial intelligence system to facilitate discussion. In some embodiments ideation program 110 can generate a chat interface that interacts with a user. In this embodiment, an interaction can be a response to a user interaction or prompt when discussion becomes stagnant. In some embodiments, ideation program 110 can generate responses to address the identified weaknesses in the determined thinking pattern.

FIG. 3 is an example diagram 300 that depicts rating calculations, in accordance with an embodiment of the present invention.

In this example, ideation program receives input 302. Input 302 contains a discussion between three participants, Mary, Wesley, and John. In this example, ideation program 110 identifies the first three sentences (e.g., S1, S2, and S3) of the discussion that were generated by Mary and Wesley.

Ideation program 110 then generates an individual score and a similarity rating for each respective sentence. In this example, the content identified with S1 (e.g., sentence 1) includes the following: "Shall we put up a welcome wall in the new office?" In this example, ideation program 110 determines the score for S1 to be [0.9, 0.05, 0.05, 0, 0] and the similarity score as [0, 0, 0, 0, 0]. Ideation program 110 then combines those scores using the following equation: [0.9*(1−0), 0.05*(1−0), 0.05*(1−0),0*(1−0), 0*(1−0)] to yield a score of [0.9, 0.05, 0.05, 0, 0] for S1.

Ideation program 110 iteratively generates an individual score and a similarity score for S2 (e.g., sentence 2). In this example, the content identified with S2 (e.g., sentence 2) includes the following: "It would make everyone feel at home, isn't it?" In this example, ideation program 110 determines the score for S1 to be [0.0, 0.05, 0.01, 0.1, 0.1] and the similarity score as [0, 0, 0, 0, 0]. Ideation program 110 then combines those scores using the following equation: [0*(1−0), 0*(1−0) 0.05*(1−0), 0.1*(1−0), 0.1*(1−0)] to yield a score of [0, 0, 0.05, 0.1, 0.1] for S2.

Ideation program 110 then adds the cumulative score for S1 (e.g., [0.9, 0.05, 0.05, 0, 0]) and S2 (e.g., [0, 0, 0.05, 0.1, 0.1]). Accordingly ideation program 110 adds [0.9, 0.05, 0.05, 0, 0]+0, 0, 0.05, 0.1, 0.1] to produce a cumulative score of [0.9, 0.05, 0.55, 0.1, 0.1].

Ideation program 110 then generates an individual score and a similarity score for S3 (e.g., sentence 3). In this example, the content identified with S3 (e.g., sentence 3) includes the following: "Let's put a welcome wall in the office". In this example, ideation program 110 determines the individual score for S3 to be [0.8, 0, 0.1, 0, 0] and the similarity score as [0.5, 0, 0.8, 0, 0] Ideation program 110 then combines those scores using the following equation: [0.8*(1−0.5), 0*(1−0), 1*(1−0.8), 0(1−0), 0*(1−0)] to yield a score of [0.4, 0, 0.02, 0, 0] for S3.

Ideation program 110 then adds the cumulative score for S1 and S2 (e.g., [0.9, 0.05, 0.55, 0.1, 0.1]) with S3 (e.g., [0.4, 0, 0.02, 0, 0]). Accordingly ideation program 110 adds [0.9, 0.05, 0.55, 0.1, 0.1])+[0.4, 0, 0.02, 0, 0]] to produce a combines score for sentences 1 and 2 of [1.3, 0.05, 0.57, 0.1, 0.1].

Figure 4:
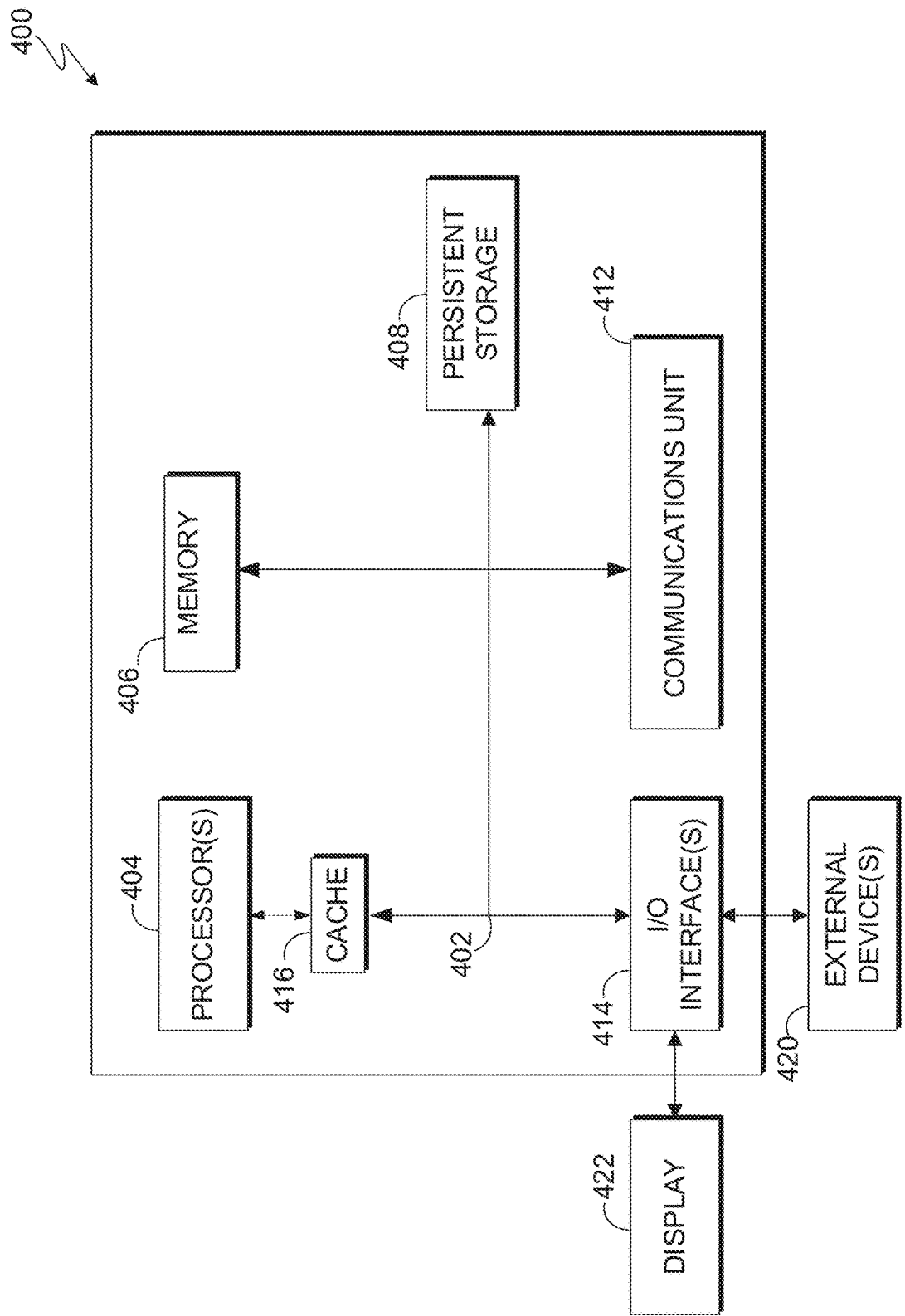
FIG. 4 depicts a block diagram of components of the computing systems of FIG. 1, in accordance with an embodiment of the present invention.

FIG. 4 depicts a block diagram of components of computing systems within haptic display environment 100 of FIG. 1, in accordance with an embodiment of the present invention. It should be appreciated that FIG. 5 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 400 includes communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 802 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Ideation program 110 (not shown) may be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Ideation program 110 may be downloaded to persistent storage 808 through communications unit 410.

I/O interface(s) 412 allows for input and output of data with other devices that may be connected to client computing device 102 and server computer 108. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    receiving user input comprising user generated text;
    rating the received user input based on characteristics identified in the received user input based combining a respective sentence score of a first sentence with a corresponding similarity score, of a second sentence to the first sentence, wherein a respective sentence score comprises a rating for each characteristic identified in the respective sentence and a corresponding similarity score of a second sentence indicates similarity of the second sentence to the first sentence based on shared characteristics of both sentences;
    determining a thinking pattern based on the rated user input; and
    generating a chat bot interface that facilitates ideation based on the determined thinking pattern.

2. The computer-implemented method of claim 1, wherein rating the received user input based on characteristics identified in the received user input comprises:
    splitting the user generated text according to one or more sentences; and
    generating a sentence score for a first sentence of the one or more sentences comprising a rating for each characteristic identified in the first sentence.

3. The computer-implemented method of claim 2, further comprising:
    generating a sentence score for a second sentence of the one or more sentences comprising a rating for each characteristic identified in the second sentence; and
    generating a similarity score for the second sentence to the first sentence based on shared characteristics of the first sentence and the second sentence.

4. The computer-implemented method of claim 3, further comprising:
    generating a combined score of the second sentence by combining rating scores of the sentence score for the second sentence with the similarity score for the second sentence.

5. The computer-implemented method of claim 4, further comprising:
    combining the combined score of the second sentence with the sentence score of the first sentence by adding the combined score of the second sentence to the sentence score of the first sentence.

6. The computer-implemented method of claim 5, further comprising:
    identifying weaknesses in the determined thinking pattern based on the combined score of the second sentence and the sentence score of the first sentence.

7. The computer-implemented method of claim 2, further comprising:

changing weight values associated with each identified characteristic according to an associated phase of discussion.

8. A computer program product comprising:
one or more computer readable storage media and program instructions stored on the one or more computer readable storage media, the program instructions comprising
program instructions to receive user input comprising user generated text;
program instructions to rate the received user input based on characteristics identified in the received user input based combining a respective sentence score of a first sentence with a corresponding similarity score, of a second sentence to the first sentence, wherein a respective sentence score comprises a rating for each characteristic identified in the respective sentence and a corresponding similarity score of a second sentence indicates similarity of the second sentence to the first sentence based on shared characteristics of both sentences;
program instructions to determine a thinking pattern based on the rated user input; and
program instructions to generate a chat bot interface that facilitates ideation based on the determined thinking pattern.

9. The computer program product of claim 8, wherein the program instructions to rate the received user input based on characteristics identified in the received user input comprise:
program instructions to split the user generated text according to one or more sentences; and
program instructions to generate a sentence score for a first sentence of the one or more sentences comprising a rating for each characteristic identified in the first sentence.

10. The computer program product of claim 9, wherein the program instructions stored on the one or more computer readable storage media further comprise:
program instructions to generate a sentence score for a second sentence of the one or more sentences comprising a rating for each characteristic identified in the second sentence; and
program instructions to generate a similarity score for the second sentence to the first sentence based on shared characteristics of the first sentence and the second sentence.

11. The computer program product of claim 10, wherein the program instructions stored on the one or more computer readable storage media further comprise:
program instructions to generate a combined score of the second sentence by combining rating scores of the sentence score for the second sentence with the similarity score for the second sentence.

12. The computer program product of claim 11, wherein the program instructions stored on the one or more computer readable storage media further comprise:
program instructions to combine the combined score of the second sentence with the sentence score of the first sentence by adding the combined score of the second sentence to the sentence score of the first sentence.

13. The computer program product of claim 12, wherein the program instructions stored on the one or more computer readable storage media further comprise:
program instructions to identify weaknesses in the determined thinking pattern based on the combined score of the second sentence and the sentence score of the first sentence.

14. The computer program product of claim 9, wherein the program instructions stored on the one or more computer readable storage media further comprise:
program instructions to change weight values associated with each identified characteristic according to an associated phase of discussion.

15. A computer system comprising:
one or more computer processors;
one or more computer readable storage media; and
program instructions stored on the one or more computer readable storage media for execution by at least one of the one or more computer processors, the program instructions comprising:
program instructions to receive user input comprising user generated text;
program instructions to rate the received user input based on characteristics identified in the received user input based combining a respective sentence score of a first sentence with a corresponding similarity score, of a second sentence to the first sentence, wherein a respective sentence score comprises a rating for each characteristic identified in the respective sentence and a corresponding similarity score of a second sentence indicates similarity of the second sentence to the first sentence based on shared characteristics of both sentences;
program instructions to determine a thinking pattern based on the rated user input; and
program instructions to generate a chat bot interface that facilitates ideation based on the determined thinking pattern.

16. The computer system of claim 15, wherein the program instructions to rate the received user input based on characteristics identified in the received user input comprise:
program instructions to split the user generated text according to one or more sentences; and
program instructions to generate a sentence score for a first sentence of the one or more sentences comprising a rating for each characteristic identified in the first sentence.

17. The computer system of claim 16, wherein the program instructions stored on the one or more computer readable storage media further comprise:
program instructions to a sentence score for a second sentence of the one or more sentences comprising a rating for each characteristic identified in the second sentence; and
program instructions to generate a similarity score for the second sentence to the first sentence based on shared characteristics of the first sentence and the second sentence.

18. The computer system of claim 17, wherein the program instructions stored on the one or more computer readable storage media further comprise:
program instructions to generate a combined score of the second sentence by combining rating scores of the sentence score for the second sentence with the similarity score for the second sentence.

19. The computer system of claim 18, wherein the program instructions stored on the one or more computer readable storage media further comprise:
program instructions to combine the combined score of the second sentence with the sentence score of the first sentence by adding the combined score of the second sentence to the sentence score of the first sentence.

20. The computer system of claim 19, wherein the program instructions stored on the one or more computer readable storage media further comprise:
    program instructions to identify weaknesses in the determined thinking pattern based on the combined score of the second sentence and the sentence score of the first sentence.

* * * * *